United States Patent
Dou et al.

(10) Patent No.: US 9,698,904 B2
(45) Date of Patent: Jul. 4, 2017

(54) APPARATUS FOR MONITORING OPTICAL SIGNAL TO NOISE RATIO, TRANSMITTER AND COMMUNICATION SYSTEM

(71) Applicant: FUJITSU LIMITED, Kawasaki-shi, Kanagawa (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 14/794,115

(22) Filed: Jul. 8, 2015

(65) Prior Publication Data

US 2016/0013863 A1    Jan. 14, 2016

(30) Foreign Application Priority Data

Jul. 9, 2014   (CN) .......................... 2014 1 0325415

(51) Int. Cl.
| | |
|---|---|
| *H04B 17/00* | (2015.01) |
| *H04B 10/079* | (2013.01) |
| *H04B 10/077* | (2013.01) |
| *H04J 14/06* | (2006.01) |
| *H04B 10/556* | (2013.01) |

(52) U.S. Cl.
CPC ... *H04B 10/07953* (2013.01); *H04B 10/0775* (2013.01); *H04B 10/5561* (2013.01); *H04J 14/06* (2013.01)

(58) Field of Classification Search
CPC .............. H04B 7/10; H04J 14/06; H04J 14/02
USPC .......................................................... 398/32
See application file for complete search history.

(56) References Cited

U.S. PATENT DOCUMENTS

| | | | |
|---|---|---|---|
| 2011/0096855 A1* | 4/2011 | Youn ................... | H04B 10/532 375/260 |
| 2011/0255870 A1* | 10/2011 | Grigoryan ............ | H04B 10/548 398/65 |
| 2012/0263465 A1* | 10/2012 | Kiuchi ............... | H04B 10/0799 398/65 |

(Continued)

OTHER PUBLICATIONS

Men Yan, et al., "Experimental Investiagion of the Training Sequence for Adaptive Equalizer Initialization in DP-16QAM System," ECOC 2013, TU.1.E.4.pdf, pp. 1-3.

(Continued)

*Primary Examiner* — Don N Vo
(74) *Attorney, Agent, or Firm* — Staas & Halsey LLP

(57) ABSTRACT

Embodiments provide an apparatus for monitoring an optical signal to noise ratio (OSNR), a transmitter and a communication system. The apparatus for monitoring optical signal to noise ratio includes: a signal extracting unit and a signal processing unit. The signal extracting unit is configured to extract pilot signals and non-pilot signals at two polarization states from received signals, frequencies of the pilot signals at the two polarization states being different, and the polarization states being differentiated by the frequencies of the pilot signals; and the signal processing unit is configured to obtain OSNRs at the two polarization states by using the pilot signals and the non-pilot signals extracted by the signal extracting unit. With the embodiments of the present disclosure, by making the frequencies of the pilot signals at different polarization states be different, OSNRs at different polarization states may be obtained more accurately.

9 Claims, 6 Drawing Sheets

(56) References Cited

U.S. PATENT DOCUMENTS

2015/0229364 A1* 8/2015 Kim ................ H04J 11/003
  370/329

OTHER PUBLICATIONS

Seiji Okamoto, et al., "Digital In-band OSNR Estimation for Polarization-Multiplexed Optical Transmission", OECC 2013, TuR2-4, pp. 1-2.
C. Do, et al., "Data-Aided OSNR Estimation for QPSK and 16-QAM Coherent Optical System", IEEE Photonic Journal, vol. 5, No. 5, Oct. 2013, pp. 6601609.

* cited by examiner

APPARATUS FOR MONITORING OPTICAL SIGNAL TO NOISE RATIO, TRANSMITTER AND COMMUNICATION SYSTEM

CROSS-REFERENCE TO RELATED APPLICATIONS

This application claims the benefit of Chinese Application No. 201410325415.6, filed Jul. 9, 2014, the disclosure of which is incorporated herein by reference.

BACKGROUND

1. Field

The present disclosure relates to the field of optical communication technologies, and in particular to an apparatus for monitoring an optical signal to noise ratio, a transmitter and a communication system.

2. Description of the Related Art

An optical signal to noise ratio (OSNR) is a quantity directly associated with performance of the system both in a conventional direct detection optical communication system and a coherent optical communication system. Hence, much attention has been paid to the study of optical signal to noise ratio monitoring technologies.

In a conventional communication system, the optical signal to noise ratio may be obtained by analyzing a spectrum of an optical signal. For a wavelength division multiplexing (WDM) system containing multiple wavelengths, signal power and noise power of a present wavelength may be obtained by switching signal light of a present channel. It is obvious that such a monitoring method interrupts traffic transmission. In order that traffics are ensured while performing OSNR monitoring, the conventional method needs to assume that a spectrum of a noise is flat and at the same time, a bandwidth of a transmitted signal is far less than a channel interval, hence, it may be selected to measure the signal and the noise at different frequency points, so as to obtain relatively accurate estimation of the OSNR.

However, as increase of an optical communication capacity, a transmission length and transmission rate of a coherent optical communication system are greatly improved than before. More optical nodes will result in larger fluctuation of spectrum shapes of noises, and an assumption that noises are evenly distributed in the spectrum will face larger challenges. And at the same time, as the channel intervals are greatly reduced, finding a band in which signals may be neglected to measure noise power becomes an impractical subject. Thus, measurement of an OSNR in a coherent communication system becomes new hot spot of studies.

In a coherent communication system, there are some methods using received light-field signals to estimate an OSNR. Transmission signals containing noises may be recovered from the received signals after the received signals experience a series of digital signal processing algorithms, such as sequence synchronization, dispersion compensation, equalization, frequency difference removal, and corresponding phase noise removal, etc. Assuming that a transmission sequence (a training sequence) is known, or an approximate transmission sequence is obtained by direct judgment, sizes of the signal and the noise may be obtained respectively, thereby estimating the OSNR of the system[1].

Nippon Telegraph & Telephone (NTT) proposes an OSNR estimation method based on pilot signals[2], in which a training sequence is designed into a form of single frequency, and power of the single frequency and a power spectrum density of noises around it may be obtained at a receiver end by using a detection algorithm, thereby obtaining an OSNR of an optical signal of the channel.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

Documents advantageous to the understanding of the present disclosure and the relevant art are listed below, which are incorporated herein by reference, as they are fully described herein.

[1] IEEE Photonic Journals 2013, pp. 6601609; and
[2] OECC 2013, TuR2-4, Digital In-band OSNR Estimation for Polarization-Multiplexed Optical Transmission.

SUMMARY

Additional aspects and/or advantages will be set forth in part in the description which follows and, in part, will be apparent from the description, or may be learned by practice of the invention.

Currently, in a method for estimating an OSNR by using received light-field signals, besides white noises added in the link, the obtained noises further contain noises introduced by nonlinearity of the optical fiber. Thus, there exists a problem that the OSNR of the system is underestimated.

A defect of the method proposed by NTT exists in that it is insensitive to a link where there exists polarization-related attenuation, that is, the OSNR value estimated by the method cannot represent an OSNR of a polarization state; and actually, performance of a channel is often limited by the worst OSNR at two polarization states.

Embodiments of the present disclosure provide an apparatus for monitoring an optical signal to noise ratio, a transmitter and a communication system, which may relatively accurately estimate an optical signal to noise ratio of a communication system having different polarization states.

According to an aspect of the embodiments of the present disclosure, there is provided an apparatus for monitoring an optical signal to noise ratio, including:

a signal extracting unit configured to extract pilot signals and non-pilot signals at two polarization states from received signals, frequencies of the pilot signals at the two polarization states being different, and the polarization states being differentiated by the frequencies of the pilot signals; and a signal processing unit configured to obtain an optical signal to noise ratio at the two polarization states by using the pilot signals and the non-pilot signals extracted by the signal extracting unit.

According to a second aspect of the embodiments of the present disclosure, there is provided a transmitter, including:

a processing unit configured to set pilot signals in payload; and a transmitting unit configured to transmit the payload where the pilot signals are set to a receiver; wherein, frequencies of the pilot signals at two polarization states are different.

According to a third aspect of the embodiments of the present disclosure, there is provided a communication system, including a transmitter and a receiver, wherein, the transmitter is configured to set pilot signals in payload, and transmit the payload where the pilot signals are set to the receiver; wherein, frequencies of the pilot signals at two polarization states are different;

and the receiver is configured to extract pilot signals and non-pilot signals at the two polarization states from received signals according to the frequencies of the pilot signals, and obtain an optical signal to noise ratio at the two polarization states by using information on the extracted pilot signals and non-pilot signals.

An advantage of the embodiments of the present disclosure exists in that the transmitter transmits signals containing pilot signals, and as the frequencies of the pilot signals at different polarization states are different, the transmit is made to extract the pilot signals and the non-pilot signals according to the frequencies of the pilot signals at different polarization states, thereby accurately estimating the optical signal to noise ratio according to the extracted pilot signals and non-pilot signals.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

Figure 1:
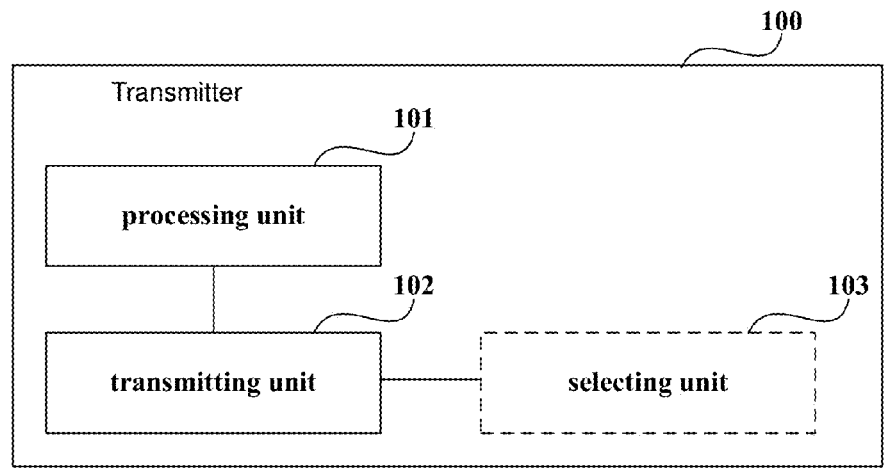
FIG. 1 is a schematic diagram of a structure of a transmitter of Embodiment 1 of the present disclosure.

Reference will now be made in detail to the embodiments, examples of which are illustrated in the accompanying drawings, wherein like reference numerals refer to the like elements throughout. The embodiments are described below to explain the present invention by referring to the figures.

Various embodiments of the present disclosure shall be described below with reference to the drawings. These embodiments are illustrative only, and are not intended to limit the present disclosure. For the principles and implementations of the present disclosure to be easily understood by those skilled in the art, the implementations of the present disclosure shall be described taking OSNR monitoring of a coherent optical communication system as an example. However, it should be understood that the implementations of the present disclosure are applicable to other communication systems performing OSNR monitoring.

In order to solve the problems existed in the relevant art and obtain respective optical signal to noise ratio at two polarization states in a polarization multiplexing system, in this embodiment, pilot signals at different polarization states at a transmitter end are differentiated. In this way, a receiver may extract pilot signals and non-pilot signals at each polarization state, thereby accurately estimating an optical signal to noise ratio at each polarization state according to the extracted pilot signals and non-pilot signals. The embodiments of this application shall be described below in detail with reference to the accompanying drawings.

Embodiment 1

FIG. 1 is a schematic diagram of a structure of a transmitter of Embodiment 1 of the present disclosure. As shown in FIG. 1, the apparatus 100 includes: a processing unit 101 and a transmitting unit 102; wherein, the processing unit 101 is configured to set pilot signals in payload, and the transmitting unit 102 is configured to transmit the payload where the pilot signals are set to a receiver; wherein, frequencies of the pilot signals at two polarization states are different.

In this embodiment, the two polarization states may be horizontal polarization state (H polarization state) and vertical polarization state (V polarization state).

It can be seen from the above embodiment that the transmitter 100 may transmit the data signals containing the pilot signals to the receiver. And as the frequencies of the pilot signals at different polarization states are different, the receiver is enabled to extract the pilot signals and the non-pilot signals at each polarization state according to the frequencies of the pilot signals at different polarization states, thereby accurately estimating an optical signal to noise ratio at each polarization state according to the extracted pilot signals and non-pilot signals, and solving the problems existed in the relevant art.

Figure 2:
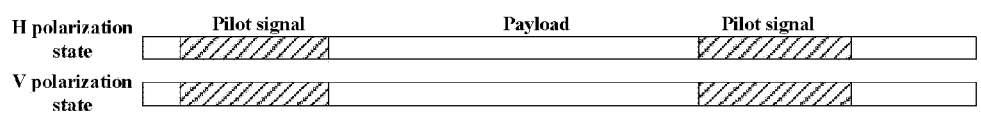
FIG. 2 is a schematic diagram of data signals where pilot signals are set of Embodiment 1 of the present disclosure.

FIG. 2 is a schematic diagram of data signals where pilot signals are set of Embodiment 1 of the present disclosure. As shown in FIG. 2, the data signals include the pilot signals and the non-pilot signals, the non-pilot signals being actually transmitted data, referred to as payload, and the data signals where pilot signals are set being frequency domain signals.

In this embodiment, the frequencies of the pilot signals at different polarization states may be made different in any manner.

For example, in order to simplify hardware complexity of the transmitter and take that the frequency domain signals are based on constellation points of transmission signals into account, the frequencies of the pilot signals at different polarization states being different is achieved by selecting different codewords.

As shown in FIG. 1, the transmitter 100 may further include a selecting unit 103 configured to select codewords at the two polarization states; wherein the codewords at the two polarization states are different; and the transmitting unit 102 transmits the payload containing the pilot signals according to the codewords at the two polarization states.

In this way, the frequencies of the pilot signals at different polarization states are made different by selecting different codewords.

For example, the selecting unit 103 may be configured to select the codewords from quadrature phase shift keying signals or binary phase shift keying signals. A method of selecting codewords shall be described below by way of examples.

Example 1

The codewords at the H polarization state and the V polarization state are all selected from the quadrature phase shift keying (QPSK) signals.

The codewords at the H polarization state and the codewords at the V polarization state may be selected four constellation points, respectively. For different polarization states, the four constellation points are different, and hence, the codewords at the H polarization state and the codewords at the V polarization state are different.

Figure 3A:
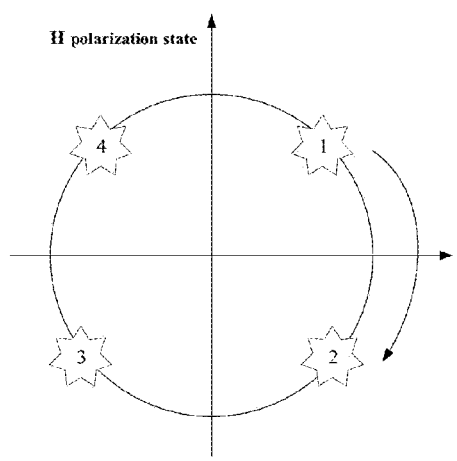
FIGS. 3A and 3B are respective schematic diagrams of selecting codewords at the H (horizontal) polarization state and at the V (vertical) polarization state according to QPSK (quadrature phase shift keying) signals according to Embodiment 1 of the present disclosure.
Figure 3B:
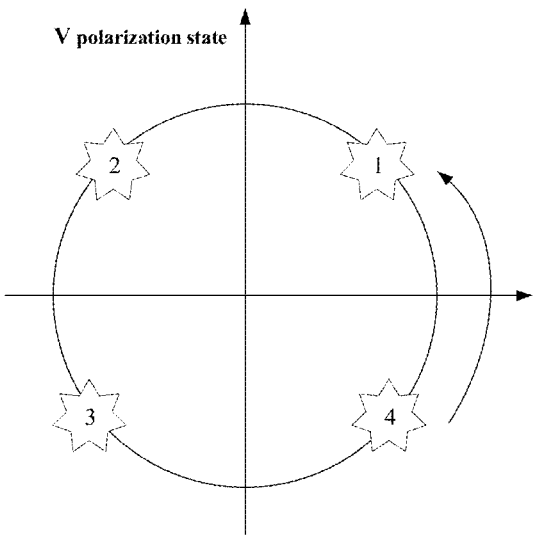

FIGS. 3A and 3B are respective schematic diagrams of selecting codewords at the H polarization state and at the V polarization state according to QPSK signals according to Embodiment 1 of the present disclosure. As shown in FIG. 3A, the codewords at the H polarization state may be four clockwise selected constellation points 1, 2, 3 and 4, in turn); as shown in FIG. 3B, the codewords at the V polarization state may be four counterclockwise selected constellation points (4, 3, 2 and 1, in turn). In this way, a frequency of the pilot signal at the H polarization state and a frequency of the pilot signal at the V polarization state corresponding to each other are positive 1/4 baud rate and negative 1/4 baud rate, respectively.

Furthermore, manners of selecting the codewords at the H polarization state and at the V polarization state are not limited to the above. For example, the codewords at the H polarization state are still the four constellation points shown in FIG. 3A, which are 1, 2, 3 and 4, in turn; while the codewords at the V polarization state are also the selected four constellation points, but their orders are 1, 3, 4 and 2 in turn, and so on, which shall not be enumerated herein any further.

Example 2

The codewords at the H polarization state and the V polarization state are all selected from the binary phase shift keying (BPSK) signals, marked by (+, −).

For example, the codewords at the H polarization state are (+−+−+−+−), and the codewords at the V polarization state are (++−−++−−++−−++−−). Hence, the frequencies of the pilot signals to which the H polarization state corresponds are +1/2 baud rate and −1/2 baud rate, and the frequencies of the corresponding pilot signals at the H polarization state are +1/4 baud rate and −1/4 baud rate.

Furthermore, manners of selecting the codewords at the H polarization state and at the V polarization state are not limited to the above. For example, according to different shapes of pulses of the transmitter, there may be frequency components of +3/4 baud rate and −3/4 baud rate, which shall not be enumerated herein any further.

In this embodiment, the selecting unit 103 is optional, which may be omitted in a case where the codewords have been selected.

An operational flow of the apparatus 100 of this embodiment shall be described below with reference to the accompanying drawings.

Figure 4:
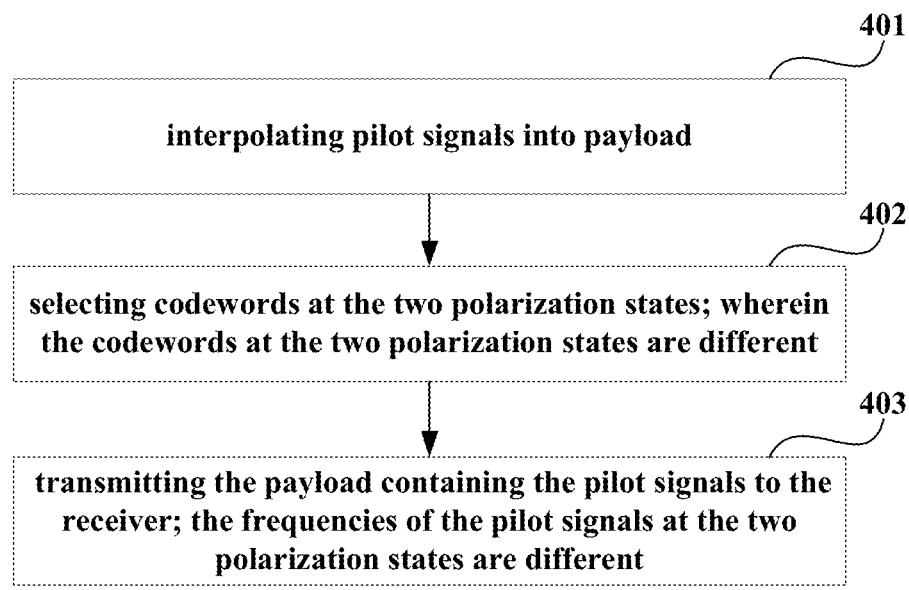
FIG. 4 is a flowchart of transmitting data of Embodiment 1 of the present disclosure.

FIG. 4 is a flowchart of transmitting data of Embodiment 1 of the present disclosure. As shown in FIG. 4, when the transmitter 100 transmits data, the method for transmitting data includes:

step 401: interpolating pilot signals into payload;

in this embodiment, at each polarization state, the processing unit 101 of the transmitter 100 is configured to interpolate the pilot signals into the payload, as shown in FIG. 2; furthermore, the payload may be generated in a signal generator, which is similar to the relevant art, and shall not be described herein any further;

step 402: selecting codewords at the two polarization states; wherein the codewords at the two polarization states are different;

in this embodiment, the selecting unit 103 of the transmitter 100 is configured to select the codewords at the two polarization states, the selected codewords at the two polarization states being different;

in this way, the frequencies of the pilot signals are made different by selecting different codewords at different polarization states, thereby differentiating pilot signals at different polarization states; and a particular method for selecting the codewords is as described above, and shall not be described herein any further;

step 403: transmitting the payload containing the pilot signals to the receiver; in this embodiment, the transmitting unit 102 of the transmitter 100 is configured to transmit the data signals containing the pilot signals to the receiver; and as the codewords of the pilot signals at different polarization states are different, the frequencies of the pilot signals at different polarization states are different.

It can be seen from the above embodiment that the transmitter transmits the data signals containing the pilot signals to the receiver, and as the frequencies of the pilot signals at different polarization states are different, the receiver is enabled to obtain optical signal to noise ratios at different polarization states, thereby solving the problems existed in the relevant art.

Embodiment 2

Figure 5:
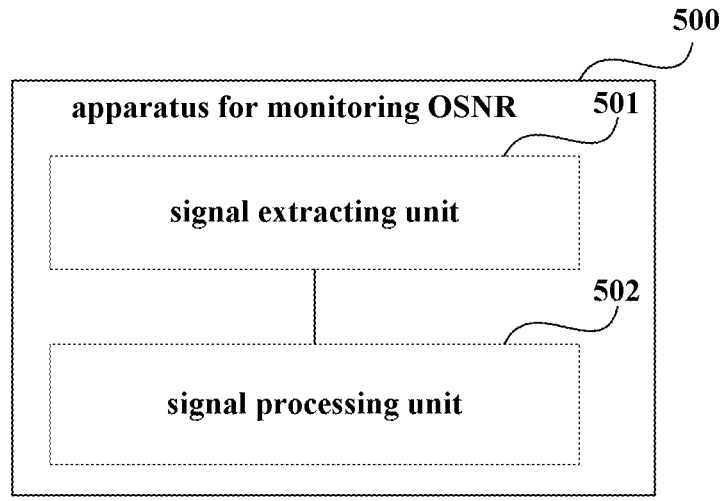
FIG. 5 is a schematic diagram of a structure of an apparatus for monitoring an optical signal to noise ratio of Embodiment 2 of the present disclosure.

FIG. 5 is a schematic diagram of a structure of an apparatus for monitoring an optical signal to noise ratio of Embodiment 2 of the present disclosure. As shown in FIG. 5, the apparatus 500 includes: a signal extracting unit 501 and a signal processing unit 502; wherein, the signal extracting unit 501 is configured to extract pilot signals and non-pilot signals at two polarization states from received signals, frequencies of the pilot signals at the two polarization states being different, and the polarization states being differentiated by the frequencies of the pilot signals;

and the signal processing unit 502 is configured to obtain optical signal to noise ratios at the two polarization states by using the pilot signals and the non-pilot signals extracted by the signal extracting unit 501.

It can be seen from the above embodiment that the apparatus 500 may receive transmission signals containing pilot signals, and as the frequencies of the pilot signals at different polarization states are different, the apparatus 500 is enabled to extract the pilot signals and the non-pilot signals at each polarization state according to the frequencies of the pilot signals at different polarization states, thereby accurately estimating an optical signal to noise ratio at each polarization state according to the extracted pilot signals and non-pilot signals, and solving the problems existed in the relevant art.

In this embodiment, the received signals are data signals where the pilot signals are set, with their constitution being as shown in FIGS. 1 and 2, which shall not be described herein any further.

In this embodiment, as the frequencies of the pilot signals at different polarization states are different, different polarization states may be differentiated by the frequencies of the pilot signals. Thus, the signal extracting unit 501 may extract the pilot signals and the non-pilot signals at different polarization states according to the frequencies of the pilot signals.

Figure 6:
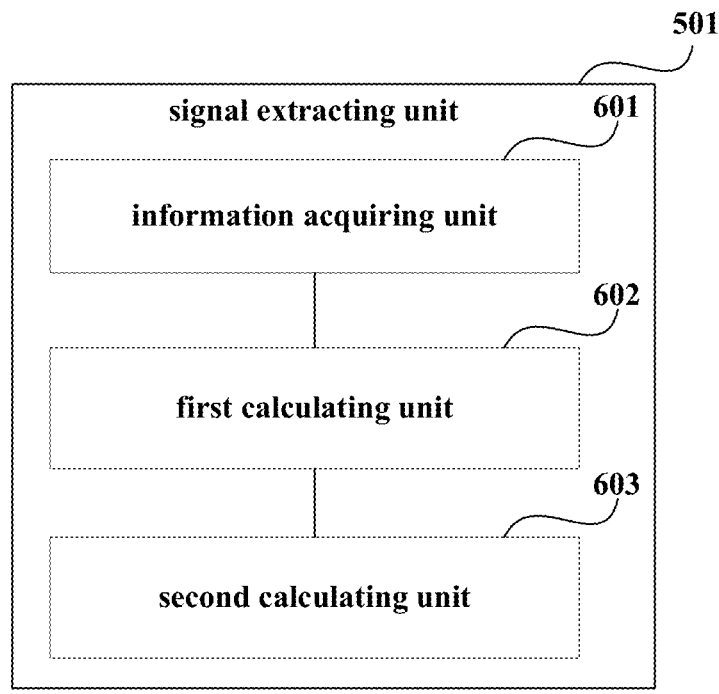
FIG. 6 is a schematic diagram of a structure of a signal extracting unit of Embodiment 2 of the present disclosure.

FIG. 6 is a schematic diagram of a structure of the signal extracting unit 501 of Embodiment 2 of the present disclosure. As shown in FIG. 6, the signal extracting unit 501 includes: an information acquiring unit 601, a first calculating unit 602 and a second calculating unit 603; wherein, the information acquiring unit 601 is configured to obtain amplitude values of two frequency points at each polarization state from the signals according to the frequencies of the pilot signals;

the first calculating unit 602 is configured to invert a transmission matrix consisting of the amplitude values;

and the second calculating unit 603 is configured to multiply an inverse matrix of the transmission matrix by the received signals, so as to obtain the pilot signals and the non-pilot signals at the two polarization states.

In this embodiment, as the received signals are time domain signals, the information acquiring unit 601 may be configured to perform Fourier transform on time domain waveforms of the received signals, so as to transform the time domain signals into frequency domain signals, thereby obtaining the amplitude values of the two frequency points at the two polarization states.

In this embodiment, the two frequency points refer to frequencies of the pilot signals at the two polarization states, and the amplitude values of the two frequency points refer to amplitude values to which the frequencies of the pilot signals at the two different polarization states. Thus, the obtained four amplitude values may constitute a transmission matrix H, which is denoted by Formula (1):

$$H = \begin{bmatrix} h_{11} & h_{12} \\ h_{21} & h_{22} \end{bmatrix}. \quad (1)$$

In this embodiment, for example, at the transmitter end, the two polarization states are an H polarization state and a V polarization state, and the pilot signals at the two polarization states are marked by PilotH and PilotV; and at the receiver end, the two polarization states are an X polarization state and a Y polarization state. Hence, in Formula (1), h11 is a component of the PilotH at the X polarization state, h12 is a component of the PilotV at the X polarization state, h21 is a component of the PilotH at the Y polarization state, and h22 is a component of the PilotV at the Y polarization state.

In this embodiment, the first calculating unit 602 is configured to invert the transmission matrix H, so as to obtain an inverse matrix $H^{-1}$ of the transmission matrix H; and the second calculating unit 603 is configured to multiply the inverse matrix $H^{-1}$ by the received time domain signals, so as to obtain polarization demultiplexed signals, i.e. the pilot signals and the non-pilot signals at the two polarization states.

In this embodiment, in order to obtain the OSNR at the two polarization states without being affected by nonlinearity, the signal processing unit 502 is configured to calculate noise power at a time when the pilot signals at the two polarization states (X and Y) occur, and calculate signal power in a period of time of the payload.

Figure 7:
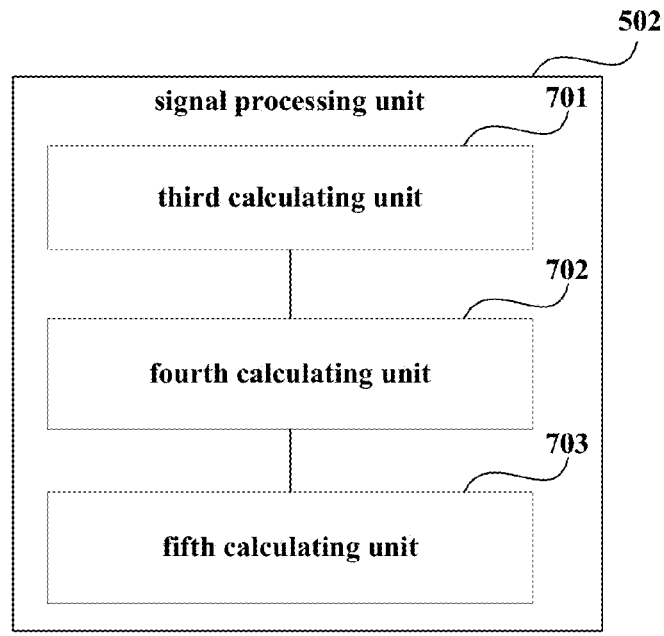
FIG. 7 is a schematic diagram of a structure of a signal processing unit of Embodiment 2 of the present disclosure.

FIG. 7 is a schematic diagram of a structure of the signal processing unit 502 of Embodiment 2 of the present disclosure. As shown in FIG. 7, the signal processing unit 502 includes: a third calculating unit 701, a fourth calculating unit 702 and a fifth calculating unit 703; wherein, the third calculating 701 is configured to estimate noise power at the two polarization states by using the pilot signals;

the fourth calculating unit 702 is configured to estimate signal power at the two polarization states by using the non-pilot signals;

and the fifth calculating unit 703 is configured to obtain the optical signal to noise ratios at the two polarization states by using the noise power and the signal power at the two polarization states.

Figure 8:
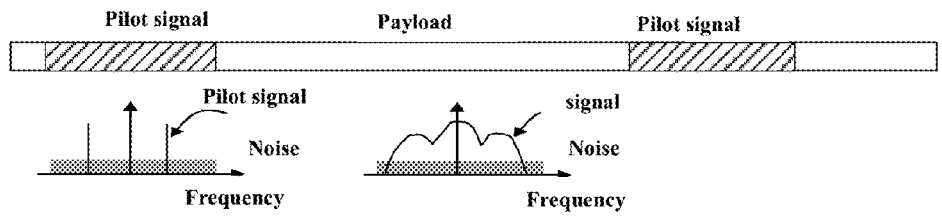
FIG. 8 is a schematic diagram of transmitting a codeword time sequence and a corresponding frequency spectrum density of Embodiment 2 of the present disclosure.

FIG. 8 is a schematic diagram of transmitting a codeword time sequence and a corresponding frequency spectrum density of Embodiment 2 of the present disclosure. As shown in FIG. 8, it is assumed that noises are evenly distributed in a band range, and the noise power is equal to a noise power frequency spectrum density multiplied by a frequency spectrum width. Thus, the third calculating 701 may be configured to multiply the noise power frequency spectrum density at each polarization state by the frequency spectrum width, so as to obtain the noise power at the polarization state; wherein, the noise power frequency spectrum density may be obtained by averaging the noise power at the frequency points of the non-pilot signals, and the frequency spectrum width refers to a length of the shadowed part at the horizontal coordinate in FIG. 8. In this embodiment, in order to tolerate a certain frequency difference (or a residual frequency difference), the frequency points of the pilot signals may be expanded rightwards and leftwards by several frequency points.

In this embodiment, the calculation of the signal power at the two polarization states is selected to be performed at the period of time of the payload. This is because that an optical transmission link often contains several optical filters. As attenuation of the frequency points where the pilot signals are present is not equal to average loss of the signals, the power of the pilot signals at the receiver end is not equal to power of the signals. The power obtained at the period of time of the payload is equal to a sum of the signal power and the noise power. Hence, the signal power at the two polarization states may be obtained by combining the noise power obtained by the third calculating 701.

In this way, the fourth calculating 702 may be configured to obtain the signal power at the two polarization states by subtracting the power at the two polarization states obtained by calculating at the period of time of the payload by the noise power at the two polarization states obtained by the third calculating 701.

In this embodiment, the fifth calculating 703 may be configured to obtain the optical signal to noise ratios at the two polarization states by using the noise power and the signal power at the two polarization states; wherein, any existing method may be used to obtain the optical signal to noise ratios. An example is given below.

For example, the optical signal to noise ratios at the two polarization states (X and Y polarization states) are obtained respectively by using Formula (2-1) and Formula (2-2):

$$\text{OSNR}_X = 10 * \log 10(S_X/n_X) - 10 * \log 10(12.5\text{e}9/\text{Bandwidth}) \quad (2\text{-}1),$$

$$\text{OSNR}_Y = 10 * \log 10(S_Y/n_Y) - 10 * \log 10(12.5\text{e}9/\text{Bandwidth}) \quad (2\text{-}2);$$

where, X denotes the X polarization state, Y denotes the Y polarization state, SX and SY are respective signal power, OSNRX and OSNRY are respective optical signal to noise ratios at the X polarization state and the Y polarization state, nX and nY are respective noise poser at the X polarization state and the Y polarization state, Bandwidth is a signal bandwidth, and the numerical value 12.5e9 is because that noise power within a bandwidth of 12.5 GHz needs to be considered in the OSNR calculation, but the numerical value 12.5e9 may be adjusted according to a particular bandwidth.

However, the embodiment of the present disclosure is not limited to above formulae (2-1) and (2-2), and the optical signal to noise ratios at two polarization states may also be obtained in other manners, which shall not be described herein any further.

It can be seen from the above embodiment that as the frequencies of the pilot signals at different polarization states are different, the two polarization states may be differentiated at the receiving end according to the frequencies of the pilot signals, the pilot signals and the non-pilot signals are extracted, and the optical signal to noise ratios at the two polarization states are calculated by using the pilot signals and the non-pilot signals.

Furthermore, in this embodiment, after the signals transmitted by the transmitter are transmitted in a link, the signals received by the receiver may contain multiple linear and nonlinear damages. Hence, the received signals may be correspondingly processed before the signal extracting unit 501 extracts the pilot signals and the non-pilot signals at the different polarization states, such as compensating for residual dispersion of the received signals, the imbalance effect of the receiver, and the frequency offset and phase noise between the receiver and the transmitter, etc. In such a case, the signal extracting unit 501 extracts the pilot signals and the non-pilot signals at the different polarization states from the processed signals.

Hence, the apparatus 500 may further include: a dispersion compensator configured to perform dispersion compensation on the received signals, an equalizer configured to perform adaptive compensation on linear damages in the link, a frequency difference compensator configured to perform estimation and compensation on a frequency difference of the demultiplexed signals, and a phase compensator configured to perform phase compensation on the frequency difference compensated signals, etc. (not shown).

In this embodiment, the above devices are optional. Furthermore, a time of the pilot signals at the time domain is dependent on a ratio of a baud rate of the signals to a laser linewidth, and in a common setting, such as in a setting of 32 GBaud and a linewidth of 1 MHz, a frequency difference and a phase noise within 100 symbols have no effect on the estimation of an OSNR. Therefore, as the pilot signals themselves are single-frequency signals and their times at the time domain are not too long, the frequency difference and the phase noise at this period of time may be deemed as having no effect on the estimation of an OSNR. Thus, the above frequency difference compensation and phase noise compensation may be omitted, that is, the frequency difference compensator and the phase noise compensator may be omitted.

In this embodiment, the above processing on the received signals may be performed by using any existing technique, such as a technique described in "Experimental Investigation of Training Sequence for Adaptive Equalizer Initialization in DP-16QAM System, ECOC 2013, TU.1.E.4", the contents of which being incorporated herein, and being not going to be described herein any further.

Figure 9:
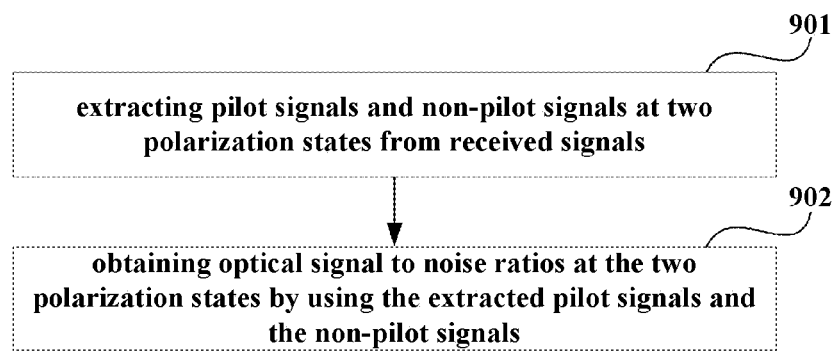
FIG. 9 is a flowchart of a method for monitoring an optical signal to noise ratio of Embodiment 2 of the present disclosure.

FIG. 9 is a flowchart of a method for monitoring optical signal to noise ratios of Embodiment 2 of the present disclosure. As shown in FIG. 9, the method includes:

step 901: extracting pilot signals and non-pilot signals at two polarization states from received signals, frequencies of the pilot signals at the two polarization states being different, and the polarization states being differentiated by the frequencies of the pilot signals;

in this embodiment, the signal extracting unit 501 is configured to extract the pilot signals and the non-pilot signals at the two polarization states, which shall be described with reference to the flow shown in FIG. 10;

step 902: obtaining optical signal to noise ratios at the two polarization states by using the extracted pilot signals and the non-pilot signals;

in this embodiment, the signal processing unit 502 is configured to obtain the optical signal to noise ratios at the two polarization states by using the extracted pilot signals and the non-pilot signals, which shall be described with reference to the flow shown in FIG. 11.

Furthermore, in this embodiment, before step 901, the method may further include:

processing the received signals, the processing including: compensating for residual dispersion of the received signals, the imbalance effect of the receiver, and the frequency offset and phase noise between the receiver and the transmitter, etc. In such a case, in step 901, the signal extracting unit 501 is configured to extract the pilot signals and the non-pilot signals at the different polarization states from the processed signals.

Figure 10:
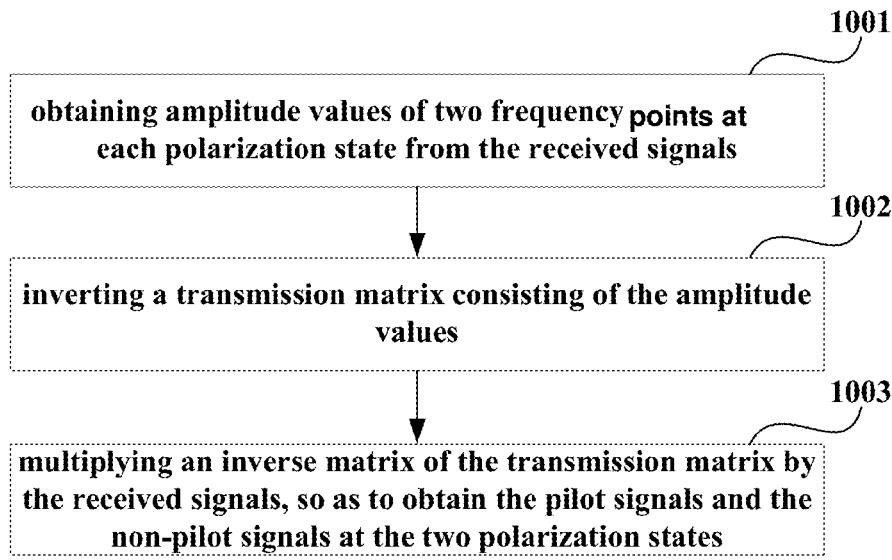
FIG. 10 is a flowchart of a method for extracting signals.

FIG. 10 is a flowchart of a method for extracting signals. As shown in FIG. 10, the method includes:

step 1001: obtaining amplitude values of two frequency points at each polarization state from the received signals according to the frequencies of the pilot signals;

in this embodiment, the signal acquiring unit 602 is configured to obtain the amplitude values, a particular method being as described above, and being not going to be described herein any further;

step 1002: inverting a transmission matrix consisting of the amplitude values;

in this embodiment, the first calculating unit 602 is configured to invert the transmission matrix;

step 1003: multiplying an inverse matrix of the transmission matrix by the received signals, so as to obtain the pilot signals and the non-pilot signals at the two polarization states;

in this embodiment, the second calculating unit 603 is configured to multiply the inverse matrix of the transmission matrix by the received signals.

Figure 11:
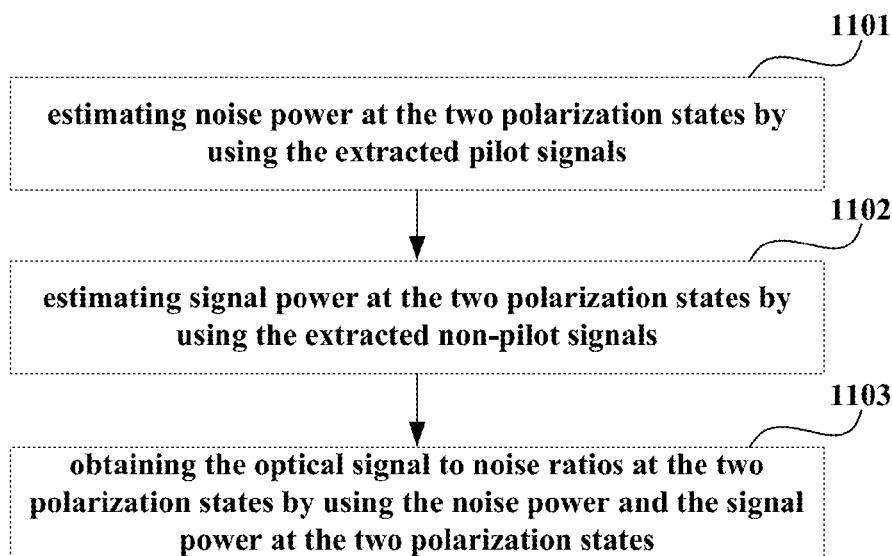
FIG. 11 is a flowchart of a method for calculating an optical signal to noise ratio.

FIG. 11 is a flowchart of a method for obtaining optical signal to noise ratios. As shown in FIG. 11, the method includes:

step 1101: estimating noise power at the two polarization states by using the extracted pilot signals;

in this embodiment, the third calculating unit 701 is configured to estimate the noise power at the two polarization states, a particular method of estimation being as described above, and being not going to be described herein any further;

step 1102: estimating signal power at the two polarization states by using the extracted non-pilot signals;

in this embodiment, the fourth calculating unit 702 is configured to estimate the signal power at the two polarization states, a particular method of estimation being as described above, and being not going to be described herein any further;

step 1103: obtaining the optical signal to noise ratios at the two polarization states by using the noise power and the signal power at the two polarization states;

in this embodiment, the fifth calculating unit 703 is configured to calculate the optical signal to noise ratios at the two polarization states, a particular method of calculation being as described in the above embodiment, and formulae (2-1) and (2-2), and being not going to be described herein any further.

It can be seen from the above embodiment that as the frequencies of the pilot signals at different polarization states are different, the two polarization states may be differentiated at the receiver end according to the frequencies of the pilot signals, the pilot signals and the non-pilot signals are extracted, and the optical signal to noise ratios at the two polarization states are calculated by using the pilot signals and the non-pilot signals.

Embodiment 3

Embodiment 3 of the present disclosure further provides a receiver, including the apparatus 500 for monitoring optical signal to noise ratio described in Embodiment 2, and its structure being as described in Embodiment 2, and being not going to be described herein any further.

Embodiment 4

Figure 12:
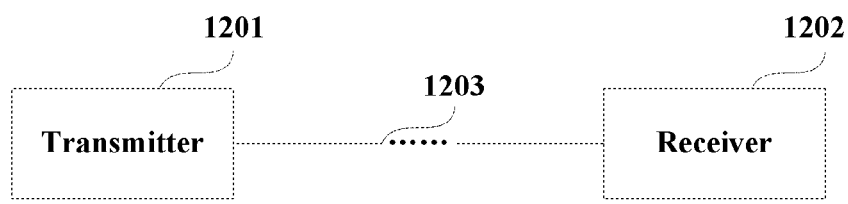
FIG. 12 is a schematic diagram of a structure of a communication system of Embodiment 4 of the present disclosure.

FIG. 12 is a schematic diagram of a structure of a coherent optical communication system of Embodiment 4 of the present disclosure. As shown in FIG. 12, the coherent optical communication system 1200 includes a transmitter 1201, a receiver 1202 and a link 1203 between the transmitter 1201 and the receiver 1202; wherein, the structure of the receiver 1202 is as described in Embodiment 3, the contents of which being incorporated herein, and being not going to be described herein any further.

In this embodiment, the transmitter 1201 may be the transmitter 100 described in Embodiment 1, the contents of which being incorporated herein, and being not going to be described herein any further.

Figure 13:
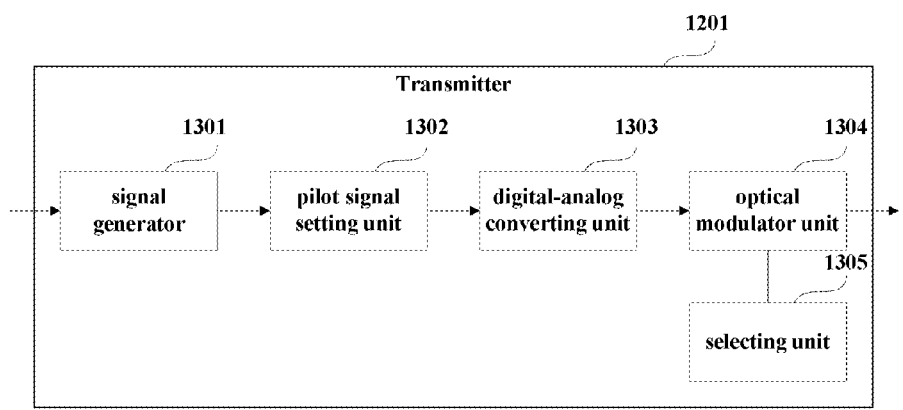
FIG. 13 is a schematic diagram of a structure of a transmitter of Embodiment 4 of the present disclosure.

FIG. 13 is a schematic diagram of the structure of the transmitter of Embodiment 4 of the present disclosure. As shown in FIG. 13, the transmitter 1201 includes: a signal generator 1301, a pilot signal setting unit 1302, a digital-analog converting unit 1303 and an optical modulator unit 1304; wherein, the signal generator 1301 is configured to generate digital signals according to transmission data, the pilot signal setting unit 1302 is configured to set the pilot signals as described in the above embodiments in the generated digital signals, the digital-analog converting unit 1303 is configured to perform digital-analog conversion on the digital signals, and the optical modulator unit 1304 is configured to modulate light taking the signals converted by the digital-analog converting unit 1303 as modulation signals.

In this embodiment, the pilot signal setting unit 1302 corresponds to the processing unit 101 in FIG. 1, and interpolates the pilot signals into the generated data signals; and the digital-analog converting unit 1303 and the optical modulator unit 1304 correspond to the transmitting unit 103 in FIG. 1; furthermore, the transmitter 1201 may include a selecting unit 1305, and the optical modulator unit 1304 is configured to perform signal modulation according to codewords selected by the selecting unit 1305, so that frequencies of the pilot signals at different polarization states are different.

Figure 14:
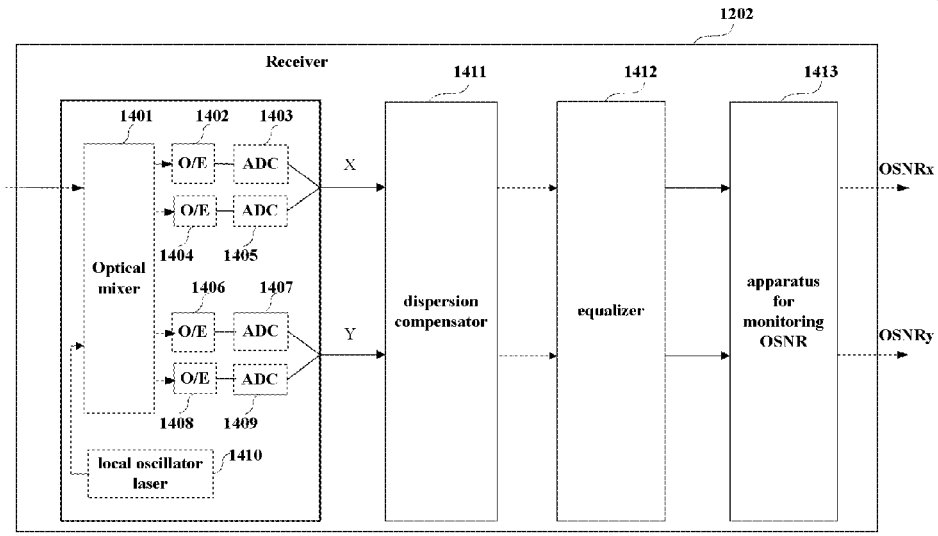
FIG. 14 is a schematic diagram of a structure of a receiver of Embodiment 4 of the present disclosure.

FIG. 14 is a schematic diagram of a structure of the receiver of Embodiment 4 of the present disclosure. As shown in FIG. 14, the receiver 1202 may be the receiver described in Embodiment 3, the contents of which being incorporated herein, and being not going to be described herein any further.

Furthermore, after the signals transmitted by the transmitter 1201 are transmitted in the link 1203, the signals received by the receiver 1202 may contain multiple linear and nonlinear damages. Hence, the received signals may be correspondingly processed before the apparatus for monitoring an optical signal to noise ratio 1413 extracts the pilot signals and the non-pilot signals at the different polarization states, such as compensating for residual dispersion of the received signals, the imbalance effect of the receiver, and the frequency offset and phase noise between the receiver and the transmitter, etc.

For example, in this embodiment, a frequency difference and a phase noise have no effect on the estimation of an OSNR. As shown in FIG. 14, the receiver 1202 includes:

a front end configured to convert inputted optical signals into baseband signals at two polarization states; in the embodiment of the present disclosure, the two polarization states may include X polarization state and Y polarization state.

As shown in FIG. 14, the front end includes: a local oscillator laser 1410, an optical mixer (optical 90 deg hybrid) 1401, optoelectronic detectors (O/E) 1402 and 1404, 1406 and 1408, and analog-digital converters (ADCs) 1403 and 1405, 1407 and 1409; wherein, the local oscillator laser 1410 is configured to provide a local light source; and optical signals are converted into baseband signals at a polarization state after passing the optical mixer (optical 90 deg hybrid) 1401, optoelectronic detectors (O/E) 1402 and 1404 and the analog-digital converters (ADCs) 1403 and 1405, and are converted into baseband signals at another polarization state after passing the optical mixer (optical 90 deg hybrid) 1401, optoelectronic detectors (O/E) 1406 and 1408 and the analog-digital converters (ADCs) 1407 and 1409, a detailed process being similar to the relevant art, and being not going to be described herein any further.

Furthermore, the receiver 1202 further includes a dispersion compensator 1411 and an equalizer 1412, the functions of which being as described in Embodiment 2, the contents of which being incorporated herein, and being not going to be described herein any further.

Furthermore, if a frequency difference and a phase noise have no effect on the estimation of an OSNR, the receiver 1202 may also include a frequency difference compensator and a phase noise compensator (not shown).

It can be seen from the above embodiment that the two polarization states are differentiated by the frequencies of the pilot signals in the coherent optical communication system, and optical signal to noise ratios at the two polarization states can be calculated, thereby obtaining more accurate optical signal to noise ratio in the coherent optical communication system.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

Regarding implementations including above embodiments 1-4, following supplements are further disclosed:

1. A method for monitoring an optical signal to noise ratio, including:
extracting pilot signals and non-pilot signals at two polarization states from received signals, frequencies of the pilot signals at the two polarization states being different, and the polarization states being differentiated by the frequencies of the pilot signals; and
obtaining optical signal to noise ratios at the two polarization states by using the extracted pilot signals and the non-pilot signals.

2. The method according to claim 1, wherein the extracting pilot signals and non-pilot signals at two polarization states from received signals includes:
obtaining amplitude values of two frequency points at each polarization state from the signals according to the frequencies of the pilot signals;
inverting a transmission matrix consisting of the amplitude values; and
multiplying an inverse matrix of the transmission matrix by the received signals, so as to obtain the pilot signals and the non-pilot signals at the two polarization states.

3. The method according to claim 1, wherein the obtaining optical signal to noise ratios at the two polarization states by using the extracted pilot signals and the non-pilot signals includes:
estimating noise power at the two polarization states by using the pilot signals;
estimating signal power at the two polarization states by using the non-pilot signals; and
obtaining the optical signal to noise ratios at the two polarization states by using the noise power and the signal power at the two polarization states.

4. A method for transmitting a signal, including:
setting pilot signals in payload; and
transmitting the payload where the pilot signals are set to a receiver; wherein, frequencies of the pilot signals at two polarization states are different.

5. The method according to claim 4, wherein the method further includes:
selecting codewords at the two polarization states; wherein the codewords at the two polarization states are different; and
transmitting the payload containing the pilot signals by using the selected codewords at the two polarization states.

6. The method according to claim 5, wherein the codewords are selected from quadrature phase shift keying signals or binary phase shift keying signals.

7. An apparatus for monitoring an optical signal to noise ratio, including:
a signal extracting unit configured to extract pilot signals and non-pilot signals at two polarization states from received signals, frequencies of the pilot signals at the two polarization states being different, and the polarization states being differentiated by the frequencies of the pilot signals; and
a signal processing unit configured to obtain optical signal to noise ratios at the two polarization states by using the pilot signals and the non-pilot signals extracted by the signal extracting unit.

8. The apparatus according to claim 7, wherein the signal extracting unit includes:
an information acquiring unit configured to obtain amplitude values of two frequency points at each polarization state from the signals according to the frequencies of the pilot signals;
a first calculating unit configured to invert a transmission matrix consisting of the amplitude values; and
a second calculating unit configured to multiply an inverse matrix of the transmission matrix by the received signals, so as to obtain the pilot signals and the non-pilot signals at the two polarization states.

9. The apparatus according to claim 8, wherein the signal processing unit includes:
a third calculating unit configured to estimate noise power at the two polarization states by using the pilot signals;
a fourth calculating unit configured to estimate signal power at the two polarization states by using the non-pilot signals; and
a fifth calculating unit configured to obtain the optical signal to noise ratios at the two polarization states by using the noise power and the signal power at the two polarization states.

10. A transmitter, including:
a processing unit configured to set pilot signals in payload; and a transmitting unit configured to transmit the payload where the pilot signals are set to a receiver; wherein, frequencies of the pilot signals at two polarization states are different.

11. The transmitter according to claim 10, wherein the transmitter further comprises:
a selecting unit configured to select codewords at the two polarization states; wherein the codewords at the two polarization states are different;
and the transmitting unit is configured to transmit the payload containing the pilot signals by using the selected codewords at the two polarization states.

12. The transmitter according to claim 11, wherein the selecting unit is configured to select the codewords from quadrature phase shift keying signals or binary phase shift keying signals.

13. A receiver, including the apparatus for monitoring an optical signal to noise ratio as described in any one of supplements 7-9.

14. A communication system, comprising a transmitter and a receiver, wherein,
the transmitter is configured to set pilot signals in payload, and transmit the payload where the pilot signals are set to the receiver; wherein, frequencies of the pilot signals at two polarization states are different;
and the receiver is configured to extract pilot signals and non-pilot signals at the two polarization states from received signals according to the frequencies of the pilot signals, and obtain optical signal to noise ratios at the two polarization states by using information on the extracted pilot signals and non-pilot signals.

15. The communication system according to claim 14, wherein the receiver comprises:
a signal extracting unit configured to extract pilot signals and non-pilot signals at two polarization states from received signals, frequencies of the pilot signals at the two polarization states being different, and the polarization states being differentiated by the frequencies of the pilot signals; and
a signal processing unit configured to obtain optical signal to noise ratios at the two polarization states by using the pilot signals and the non-pilot signals extracted by the signal extracting unit.

16. The communication system according to claim 15, wherein the signal extracting unit comprises:
an information acquiring unit configured to obtain amplitude values of two frequency points at each polarization state from the signals according to the frequencies of the pilot signals;
a first calculating unit configured to invert a transmission matrix consisting of the amplitude values; and
a second calculating unit configured to multiply an inverse matrix of the transmission matrix by the received signals, so as to obtain the pilot signals and the non-pilot signals at the two polarization states.

17. The communication system according to claim 14, wherein the transmitter is configured to make the frequencies of the pilot signals at the two polarization states be different by selecting different codewords at the two polarization states.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. An apparatus for monitoring an optical signal to noise ratio, configured in a receiver end of a communication system, comprising:
a digital signal processor being configured to:
extract pilot signals and non-pilot signals at two polarization states from received signals, frequencies of the pilot signals at the two polarization states being different, and the two polarization states being differentiated by the frequencies of the pilot signals; and
obtain optical signal to noise ratios at the two polarization states by using the pilot signals and the non-pilot signals.

2. The apparatus according to claim 1, wherein the digital signal processor is further configured to:
obtain amplitude values of two frequency points at each polarization state from the signals according to the frequencies of the pilot signals;
invert a transmission matrix of the amplitude values; and
multiply an inverse matrix of the transmission matrix by the received signals, to obtain the pilot signals and the non-pilot signals at the two polarization states.

3. The apparatus according to claim 2, wherein the digital signal processor is further configured to:
estimate noise power at the two polarization states by using the pilot signals;
estimate signal power at the two polarization states by using the non-pilot signals; and
obtain the optical signal to noise ratios at the two polarization states by using the noise power and the signal power at the two polarization states.

4. A transmitter, configured in a transmitting end of a communication system, comprising:
a digital signal processor to:
set pilot signals in a payload, and
transmit the payload where the pilot signals are set to a receiver, where frequencies of the pilot signals at two polarization states are different and the polarization state being differentiated by the frequencies of the pilot signals,
wherein the receiver obtains optical signal to noise ratios at the two polarization states by using the pilot signals and the non-pilot signals.

5. The transmitter according to claim 4, wherein the digital signal processor is further configured to:
select codewords at the two polarization states, where the codewords at the two polarization states are different; and
transmit the payload containing the pilot signals using the selected codewords at the two polarization states.

6. The transmitter according to claim 5, wherein the digital signal processor is further configured to: select the codewords from one of quadrature phase shift keying signals and binary phase shift keying signals.

7. A communication system, comprising: a transmitter and a receiver, wherein:
a transmitter configured to:
set pilot signals in a payload, and transmit the payload where the pilot signals are set to the receiver, where frequencies of the pilot signals at two polarization states are different and the two polarization states being differentiated by the frequencies of the pilot signals; and
a receiver configured to:
extract the pilot signals and non-pilot signals at the two polarization states from received signals according to the frequencies of the pilot signals, and obtain optical signal to noise ratios at the two polarization states using information on extracted pilot signals and the non-pilot signals.

8. The communication system according to claim 7, wherein the receiver is further configured to:
obtain amplitude values of two frequency points at each polarization state from the signals according to the frequencies of the pilot signals;
invert a transmission matrix of the amplitude values; and
multiply an inverse matrix of the transmission matrix by the received signals to obtain the pilot signals and the non-pilot signals at the two polarization states.

9. The communication system according to claim 7, wherein the transmitter is configured to make the frequencies of the pilot signals at the two polarization states different by selecting different codewords at the two polarization states.

* * * * *